US006250339B1

United States Patent
Ikegami et al.

(10) Patent No.: US 6,250,339 B1
(45) Date of Patent: Jun. 26, 2001

(54) SOUND-ABSORBING AND HEAT-INSULATING DUCT

(75) Inventors: Hiroshi Ikegami; Susumu Okairi, both of Osaka (JP)

(73) Assignee: Totaku Industries, Inc., Takatsuki (JP)

( * ) Notice: Subject to any disclaimer, the term of this patent is extended or adjusted under 35 U.S.C. 154(b) by 0 days.

(21) Appl. No.: 09/493,197

(22) Filed: Jan. 28, 2000

(30) Foreign Application Priority Data

Jan. 29, 1999 (JP) .................................................. 11-022288

(51) Int. Cl.$^7$ .................................................... F16L 11/10
(52) U.S. Cl. ........................ 138/149; 138/132; 138/129; 138/137; 138/144
(58) Field of Search .................................... 138/149, 129, 138/132–134, 140–144, 154, 137

(56) References Cited

U.S. PATENT DOCUMENTS

| | | | |
|---|---|---|---|
| 3,916,953 | * 11/1975 | Nagayoshi et al. | 138/132 X |
| 4,172,474 | * 10/1979 | Stahl | 138/132 |
| 4,620,569 | * 11/1986 | Von Glanstatten et al. | 138/132 |
| 5,795,634 | * 8/1998 | Fukui | 138/129 X |
| 5,806,567 | * 9/1998 | Fukui et al. | 138/132 |
| 6,179,009 | * 1/2001 | Fukui | 138/132 X |

* cited by examiner

Primary Examiner—Patrick Brinson
(74) Attorney, Agent, or Firm—McGinn & Gibb, PLLC

(57) ABSTRACT

There is provided a sound-absorbing and a heat-insulating duct comprising a nonwoven cloth layer 1, a reinforcing core 2, a foam strip layer 3, a bonding resin 4 and resin-coating layer 5. The nonwoven cloth layer 1 is formed by wound spirally a nonwoven cloth 10 into a tube-like shape in which adjacent side edges of the adjacent nonwoven cloths 10 are brought in abutment against or lapped with each other so as to form a bonding portion 1a. The reinforcing core 2 made of hard synthetic resin material is wound spirally on the bonding portion 1a while a surface of the reinforcing core 2 being brought into contact with the nonwoven cloth 10 is welded or bonded to the nonwoven cloth 10. The foam strip layer 3 is formed by wound spirally a foam resin strip 30 having a width approximately equal to a width of the nonwoven cloth 10. Both adjacent edges 3a, 3b of the foam resin strip are disposed on adjacent reinforcing cores 2, 2 respectively. The bonding resin 4 is applied to a side surface 30B of the foam strip 30 and a part 2A of the reinforcing core 2. The resin-coating layer 5 is provided to cover an outer circumferential surface of the foam strip layer 3. Accordingly, it is possible to provide a sound-absorbing and heat-insulating functions, which is suitable for use as an air-blow duct, and which is suitable for continuous production so that the duct can be mass-produced inexpensively.

19 Claims, 3 Drawing Sheets

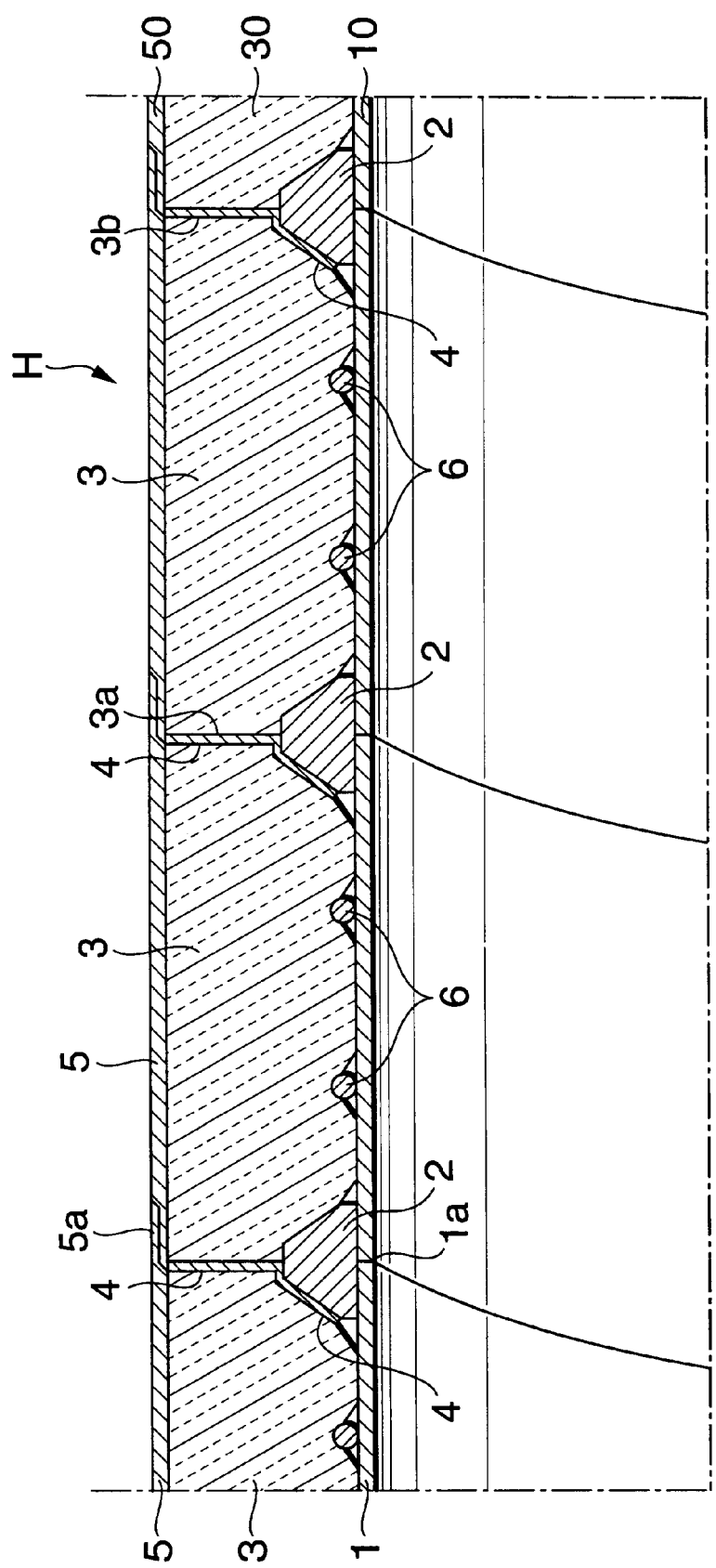

SOUND-ABSORBING AND HEAT-INSULATING DUCT

BACKGROUND OF THE INVENTION

The present invention relates to a gas transfer duct, and particularly to a gas transfer duct having a heat-insulating effect and a sound-absorbing effect suitable for transferring air-conditioning air which is set to have temperature different from room temperature.

Such a conventional gas transfer duct generally has a structure in which heat-insulating foamed material is spirally wound around an outer circumferential surface of a duct body with no space, a thin film-like resin tape is wound around an outer circumferential of the heat-insulating foamed material and the duct body defines an inner circumferential surface of the duct.

In such a conventional duct having a structure in which a duct body defines an inner circumferential surface of the duct, the duct becomes a guide cylinder through which noise generated from an air-blow source such as an air blower is guided to an opening portion of the duct while gas is transferred. The noise is discharged together with the gas, to thereby give people an unpleasant feeling. There has been a problem that such noise jars on people's nerves because it is generated continuously while the duct is in use, that is, in air-blowing operation.

In order to solve the above-mentioned problem belonging to air-blow ducts of the conventional type, that is, to largely reduce such the unpleasant noise discharged from the opening of the duct though it may be impossible to entirely extinguish such an unpleasant noise, there has been developed and proposed a structure which is taught by Japanese patent unexamined publication No. Hei. 9-89357. In structure, woven cloth having predetermined width is wound spirally, and then, connection edges of the cloths thus wound are bonded to each other with strip-shaped hard resin material, so that an internal surface layer of a duct is defined. A foam strip of open cells is spirally wound on an outer circumferential surface of the woven cloth while adjacent side edges of the adjacent foam strips are brought into contact with each other, so that an open-cell foam layer is formed. A thin film sheet-like strip is spirally wound on an outer circumferential surface of the open-cell foam so as to form an intermediate sheet layer. A foam strip of closed-cell foam is spirally wound on an outer circumferential surface of the intermediate sheet layer so as to form a closed-cell foam layer. A resin tape is spirally wound on an outer circumference of the closed-cell foam so as to form an external surface layer which wraps the outermost circumference thereof.

This air-blow duct is a product having a superior effect to be able to show substantially practically perfect effects of noise-reducing and heat-insulating functions as expected. The duct is therefore an ideal and suitable product for use as an air-blow duct. This product has, however, only one problem that the manufacturing process is complicated and its cost is not satisfied.

SUMMARY OF THE INVENTION

Accordingly, an object of the present invention is to provide a sound-absorbing and heat-insulating duct which is simple, not complicated, in structure, which can achieve both sound-absorbing and heat-insulating functions in spite of its simple structure, which is suitable for use as an air-blow duct, and which is suitable for continuous production so that the duct can be mass-produced inexpensively.

The above-mentioned object can be attained by a sound-absorbing and heat-insulating duct, according to the present invention, comprising a nonwoven cloth layer, a reinforcing core, a foam strip layer, a bonding resin, and a resin-coating layer. The nonwoven cloth layer is formed in such a manner that a nonwoven cloth having a predetermined width is wound spirally into tube-like shape, and then adjacent side edges of the adjacent nonwoven cloths thus wound are brought in abutment against or lapped with each other so as to form a bonding portion. The wire-shaped reinforcing core is made of hard synthetic resin material, and wound spirally on the bonding portion of the nonwoven cloth while a surface of the reinforcing core which is brought into contact with the nonwoven cloth is welded or bonded to the nonwoven cloth. The foam strip layer is formed in such a manner that a foam resin strip having a width approximately equal to the width of the nonwoven cloth is wound spirally so that both adjacent edges of the foam resin strip are disposed on the two adjacent reinforcing cores respectively. The bonding resin is applied to the wound side surface of the foam strip and the wound part of the reinforcing core bonded to a unwound side surface of a foam strip and a unwound side surface of a reinforcing core. That is, a side surface of the foam resin strip which has been already wound spirally and a side surface of the foam resin strip which is to be wound next to the thus wound foam resin strip are bonded by the bonding resin, and a part of the reinforcing core which has been already wound spirally and the side surface of the foam resin strip which is to be wound next are also bonded by the bonding resin. The resin-coating layer is provided to cover an outer circumferential surface of the foam strip layer.

In order to carrying out the present invention, it is preferable that the bonding resin is a half melted resin, such as EVA or PE, extruded from a die of a extruder.

In the above-mentioned construction, it is advantageous that the bonding resin is also bonded to an outer circumferential of the nonwoven cloth layer.

Further, in the above-mentioned construction, it is advantageous that the bonding resin is bonded to an outer circumferential of the foam strip.

Furthermore, in the above-mentioned construction, it is advantageous that the surface of the reinforcing core which is brought into contact with the nonwoven cloth is flat, so that the reinforcing core is surely bonded to the nonwoven cloth thereat.

Moreover, in the above-mentioned construction, it is also advantageous that the resin-coating layer is formed by winding spirally a tape made of polyolefin resin or polyvinyl chloride resin, which has weatherproof and a less aging deterioration.

BRIEF DESCRIPTION OF THE DRAWINGS

FIG. 3 shows an enlarged view of a duct wall portion of a duct of a second embodiment.

DETAILED DESCRIPTION OF THE PREFERRED EMBODIMENTS

Figure 1:
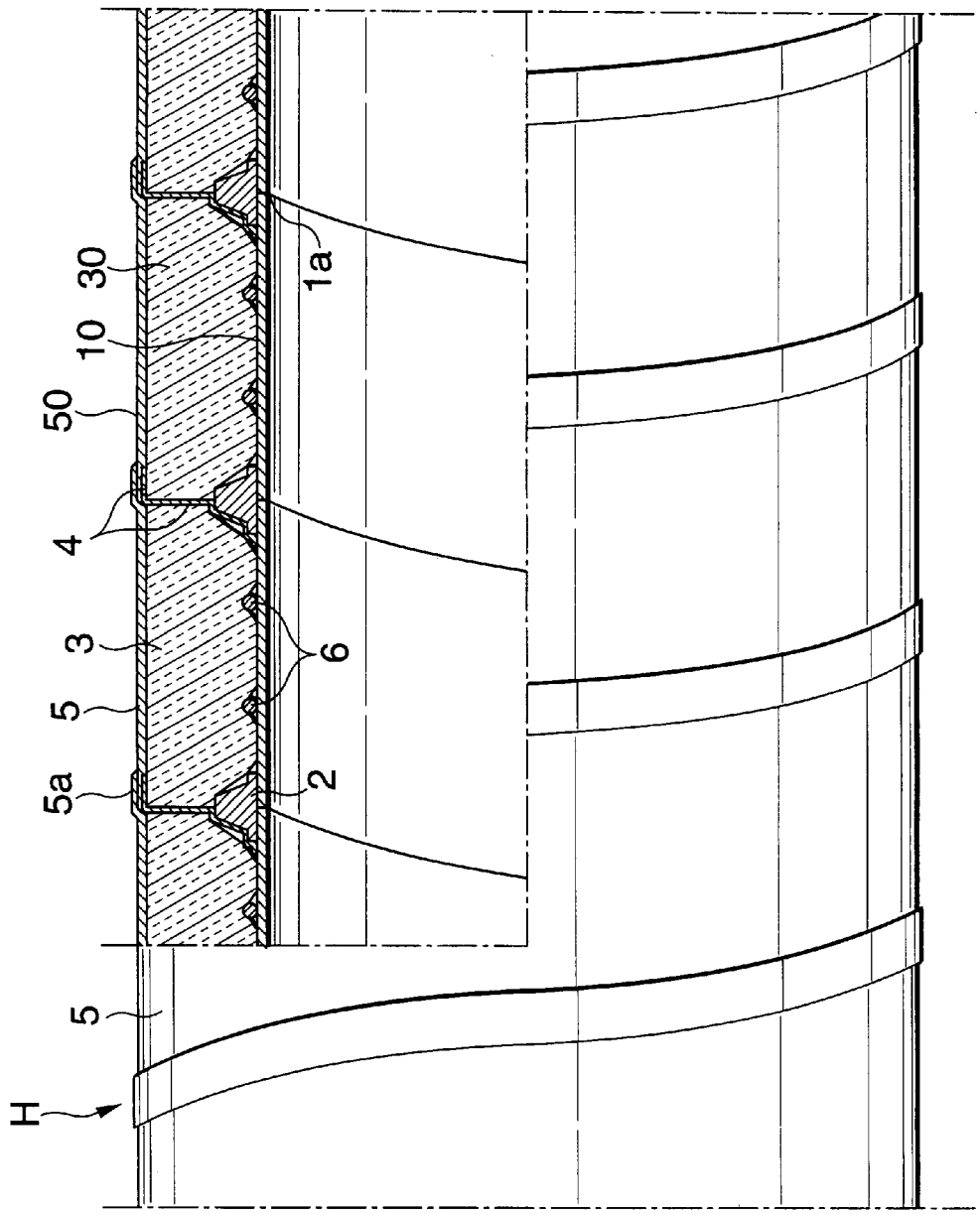
FIG. 1 shows a partially cutaway front view showing a duct of a first embodiment.
Figure 2:
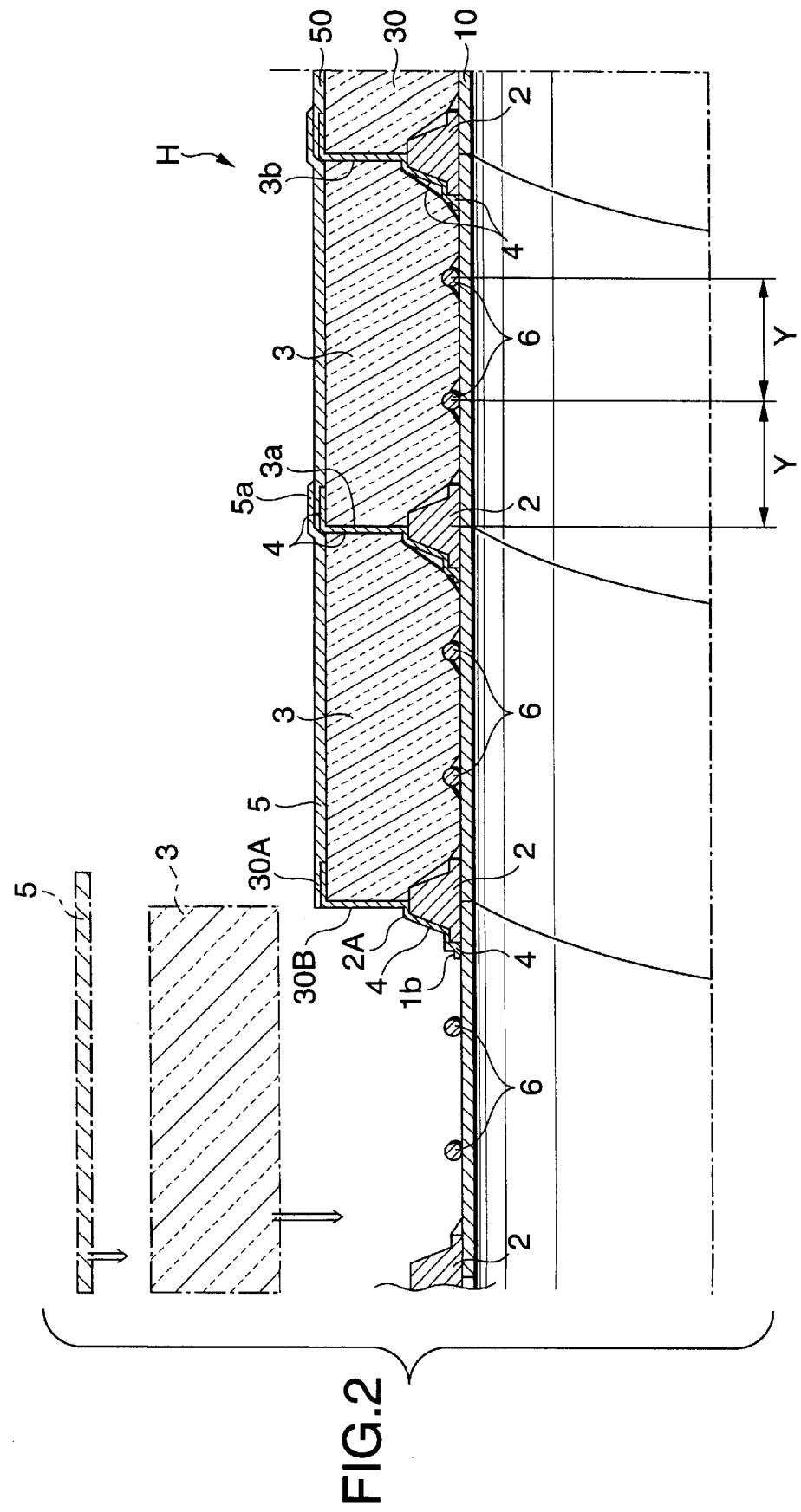
FIG. 2 shows an enlarged view of a duct wall portion of the duct of the first embodiment.

Preferred embodiments of the present invention will be described below with reference to the drawings. FIGS. 1 and 2 show a preferred embodiment of the present invention.

FIG. 1 shows a duct wall in which a portion is cut away along the axial direction, and FIG. 2 shows a cross sectional view of the duct wall portion.

A sound-absorbing and heat-insulating duct H of the embodiment is a duct having a cylindrical section and having a structure as follows.

A long-size strip nonwoven cloth 10 is wound spirally while adjacent side edges of the adjacent nonwoven cloths 10 in widthwise direction are in abutment against or lapped with each other, so that a cylindrical nonwoven cloth layer 1 is formed which defines the innermost circumferential surface of the duct. The nonwoven cloth 10 is formed by cutting at a predetermined width of about 0.3~1.0 mm a film nonwoven cloth which is made of chemical fiber subjected to moth proof and mildew proof finish.

A reinforcing core 2, for example, made of hard PP resin, which has been extruded from a die of a resin-extruder, is wound spirally on an outer circumferential surface of the cylindrical nonwoven cloth layer 1 and on-the abutment or lapped bonding portions 1a, while a surface of the reinforcing core 2 which is brought into contact with the nonwoven cloth 10 is welded or bonded thereto. The reinforcing core 2 of a first embodiment has a inverse T-shaped section-having a flat and linear surface, and the reinforcing core 2 is wound on the nonwoven cloth 1 so that the flat and linear surface of the reinforcing core 2 faces to the nonwoven cloth side. At the same time, two thin wires 6, 6 of other hard PP resin is extruded from the die of the resin-extruder, and then the wires 6, 6 are wound spirally at a predetermined interval Y between adjacent reinforcing cores 2, 2 while being welded or bonded to the nonwoven cloth 10 as shown in FIG. 2. Next, a foam resin strip 30 of closed-call foam or open-cell foam, having a width approximately equal to a width between adjacent reinforcing cores 2, 2, is wound spirally on the nonwoven cloth layer 1 between the adjacent reinforcing cores 2, 2.

When this foam resin strip 30 is wound spirally, a bonding resin 4 is applied to a side surface 30B of the foam resin strip 30, a partial top surface 30A of the foam resin strip 30, a part 2A of the reinforcing core 2, and a partial outer circumferential surface 1b of the nonwoven cloth layer 1 as shown in FIG. 2. The side surface 30B is located between a foam resin strip 30 which has been already wound spirally and an adjacent foam resin strip 30 which is to be wound next, and the part 2A is located between a reinforce core 2 which has been already wound spirally and an adjacent foam resin strip 30 which is to be wound next, as shown in FIG. 2. At this time, the bonding resin 4 is half melted immediately after EVA or PE resin has been extruded from the die of the extruder.

That is, the foam strip layer 3 is formed in such a state that an adjacent side edge 3a of the foam strip 30 is bonded by the bonding resin 4 to an adjacent side edge 3b of an adjacent foam strip 30 on a reinforcing core 2, and the foam strip 30 is also bonded by the bonding resin 4 to the partial outer circumferential surface 1b of the nonwoven cloth 10 and the part 2A of the reinforcing core 2. Next, a film tape 50 made of soft PVC is wound spirally on the outer circumferential surface of the foam strip layer 3, so that the resin-coating layer 5 is formed. The film tape 50 is wider in width than the foam strip 30 by a length of a lapped portions 5a thereof and the lapped portion 5a of respective the tapes 50 are bonded to each other when the film tape 50 is wound.

FIG. 3 shows a second embodiment, in which a reinforcing core 2 having a truncated triangular pyramid shaped section, and a bonding resin 4 applied to a side surface of a foam resin strip 30 and a part of the reinforcing core 2, are different from that in the above-mentioned first embodiment. Other structures of a sound-absorbing and heat-insulating duct according to the second embodiment are the same with the first embodiment.

Although description was made about embodiments regarded as representatives of the present invention, the present invention is not always limited to those ducts which were described in the structures of these embodiments. For example, the present invention may be carried out as a duct in which a sectional shape of a reinforcing core 2 has a sectional shape different from that in the above-mentioned embodiments and a variation of resins different from that in the above-mentioned embodiments may be applied.

The present invention is based on Japanese Patent Application No. Hei. 11-022288, which is incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As is apparent from the above-mentioned description, in a sound-absorbing and heat-insulating duct according to the present invention, a nonwoven cloth is adopted as material for sequentially forming an internal wall of the duct while a shape of the nonwoven cloth is retained by a reinforcing core, a foam strip layer is formed in such a manner that. adjacent side edges of adjacent foam strips are bonded by a bonding resin to each other on the reinforcing core and the foam strip is also bonded to the reinforcing core on an outer surface of the nonwoven cloth layer. Further, a coating layer is formed on an outer surface of the foam strip layer. Accordingly, both of the nonwoven cloth layer defining the inner wall and the foam strip layer formed on the outer surface thereof have a sound-absorbing effect and a heat-insulating effect. That is, it is possible to simultaneously control the sound-absorbing effect and the heat-insulating effect through two layers of the nonwoven strip layer and the foam strip layer. Specially, in a sound-absorbing and heat-insulating duct according to the present invention, portions where adjacent side edges of the adjacent foam strips are brought in abutment with each other are disposed on the reinforcing core having a little sound-absorbing effect, and the abutment portions thereof are bonded by a bonding resin to each other so as not to separate them, and the foam strips are also bonded to the reinforcing core so as not to separate them. Further, the foam strip can retain in abutment state without separating from the nonwoven cloth. Accordingly, the bonding resin is interposed between the adjacent foam strips so as to form an independent area within which sound and heat which have passed though the nonwoven cloth can be effectively sound-attenuated and heat-insulated, so that it is possible to enjoy sound-reducing and heat-insulating effects of the entire duct.

Moreover, as is the above-mentioned description, adjacent side-edges of adjacent foam strips thus wound are bonded to each other, and the foam strips also are bonded to the reinforcing core. Therefore, even if the duct is cut, the foam strips are not disassemble and come out from the inner wall. Further, even if the duct is bent to make a duckwork, any gap does not raise between the adjacent side edges of the respective foam strips. Accordingly, there is a remarkable effect that it is possible to use the duct without reducing the sound-reducing and the heat-insulating effects. Further, there is a conspicuous effect that it is possible to provide a duct which is simple, not complicated, and has less layers in structure, which can have sound-absorbing and heat-insulating efficiencies, which is suitable for continuous production so that the duct can be mass-produced inexpensively.

What is claimed is:

1. A sound-absorbing and heat-insulating duct comprising:
   a cylindrical nonwoven cloth layer formed by winding spirally a nonwoven cloth, adjacent side edges of said nonwoven cloth being abutted or overlapped to form a bonding portion;
   a wire-shaped reinforcing core made of hard synthetic resin material, wound spirally on an outer circumferential surface of said bonding portion, an inner circumference surface of said duct with a substantially smooth cylindrical shape being formed of said spirally wound nonwoven cloth welded to or bonded with said resin reinforcing core;
   a foam strip layer formed by winding spirally a foam resin strip having a width approximately equal to a width of said nonwoven cloth, both edges of the foam resin strip being disposed on adjacent reinforcing cores respectively;
   a bonding resin applied to a side surface of the foam strip and a part of said reinforcing core; and
   a cylindrical resin-coating layer provided to cover an outer circumferential surface of the foam strip layer.

2. The duct according to claim 1, wherein said bonding resin is also applied to an outer circumferential of the nonwoven cloth layer.

3. The duct according to claim 1, wherein said bonding resin is also applied to an outer circumferential of the foam strip.

4. The duct according to claim 2, wherein said bonding resin is further applied to an outer circumferential of the foam strip.

5. The duct according to claim 1, wherein a surface of the reinforcing core bonding with or welding to the nonwoven cloth is flat.

6. The duct according to claim 1, wherein said resin-coating layer is formed by spirally winding a tape made of polyolefin resin or polyvinyl chloride resin.

7. The duct according to claim 2, wherein said resin-coating layer is formed by spirally winding a tape made of polyolefin resin or polyvinyl chloride resin.

8. The duct according to claim 3, wherein said resin-coating layer is formed by spirally winding a tape made of polyolefin resin or polyvinyl chloride resin.

9. The duct according to claim 4, wherein said resin-coating layer is formed by spirally winding a tape made of polyolefin resin or polyvinyl chloride resin.

10. The duct according to claim 5, wherein said resin-coating layer is formed by spirally winding a tape made of polyolefin resin or polyvinyl chloride resin.

11. The duct according to claim 1, wherein said cylindrical nonwoven cloth layer, said foam strip layer and said cylindrical resin-coating layer constitute a three layered duct.

12. A sound-absorbing and heat-insulating duct comprising:
    a cylindrical nonwoven cloth layer formed by winding spirally a nonwoven cloth, adjacent side edges of said nonwoven cloth being abutted or overlapped to form a bonding portion;
    a wire-shaped reinforcing core made of hard synthetic resin material, wound spirally on an outer circumferential surface of said bonding portion, an inner circumference surface of said duct with a substantially smooth cylindrical shape being formed of said spirally wound nonwoven cloth welded to or bonded with said resin reinforcing core;
    a foam strip layer formed by winding spirally a foam resin strip having a width approximately equal to a width of said nonwoven cloth, both edges of the foam resin strip being disposed on adjacent reinforcing cores respectively;
    a bonding resin continuously applied to a first bonding portion and a second bonding portion, said first bonding portion being formed on a side surface of one of adjacent foam resin strips and said second portion being formed on an outer surface of said reinforcing core located between the reinforcing core and a side surface of the other of adjacent foam resin strips; and
    a cylindrical resin-coating layer provided to cover an outer circumferential surface of the foam strip layer.

13. The duct according to claim 12, wherein said bonding resin is continuously applied to said first bonding portion, said second bonding portion and also said third bonding portion which is formed on an outer circumferential surface of the nonwoven cloth layer to be contacted with an inner circumferential surface of the other of adjacent foam resin strips.

14. The duct according to claim 12, wherein said bonding resin is also applied to a fourth bonding portion formed on an outer circumferential surface of said one of adjacent foam resin strips.

15. The duct according to claim 13, wherein said bonding resin is continuously applied to said first bonding portion, said second bonding portion, a third bonding portion and also a fourth bonding portion formed an outer circumferential surface of said one of adjacent foam resin strips.

16. The duct according to claim 1, wherein at least two wires are wound spirally on the outer circumferential surface of said cylindrical nonwoven cloth layer at a predetermined interval and disposed between said adjacent wire-shaped reinforcing cores.

17. The duct according to claim 16, wherein the at least two wires are made of hard synthetic resin material different from said hard synthetic resin material of which the wire-shaped reinforcing core is made.

18. The duct according to claim 12, wherein at least two wires are wound spirally on the outer circumferential surface of said cylindrical nonwoven cloth layer at a predetermined interval and disposed between said adjacent wire-shaped reinforcing cores.

19. The duct according to claim 18, the at least two wires are made of hard synthetic resin material different from said hard synthetic resin material of which the wire-shaped reinforcing core is made.

* * * * *